(12) United States Patent
Hedrick et al.

(10) Patent No.: US 7,316,733 B1
(45) Date of Patent: Jan. 8, 2008

(54) DIFFUSER FOR SEPARATOR VESSEL

(75) Inventors: Brian W. Hedrick, Rolling Meadows, IL (US); Richard A. Johnson, II, Algonquin, IL (US); Paul A. Sechrist, South Barrington, IL (US); Hadjira Iddir, Schaumburg, IL (US)

(73) Assignee: UOP LLC, Des Plaines, IL (US)

(*) Notice: Subject to any disclaimer, the term of this patent is extended or adjusted under 35 U.S.C. 154(b) by 513 days.

(21) Appl. No.: 11/040,898

(22) Filed: Jan. 21, 2005

(51) Int. Cl.
*B01D 45/12* (2006.01)
(52) U.S. Cl. ............... 95/269; 55/347; 55/348; 55/418; 55/459.1; 422/147; 422/187
(58) Field of Classification Search ............ 95/269, 95/271; 55/343, 346, 347, 348, 418, 459.1; 422/147, 187
See application file for complete search history.

(56) References Cited

U.S. PATENT DOCUMENTS

| | | | |
|---|---|---|---|
| 4,221,655 A | 9/1980 | Nakayama et al. ......... 209/211 |
| 5,681,450 A | 10/1997 | Chitnis et al. .............. 208/113 |
| 5,690,709 A | 11/1997 | Barnes ....................... 55/348 |
| 6,137,022 A | 10/2000 | Kuechler et al. ........... 585/638 |
| 6,270,544 B1 | 8/2001 | Mencher et al. ............. 55/318 |
| 6,673,133 B2 | 1/2004 | Sechrist et al. .............. 55/348 |
| 6,797,026 B2 | 9/2004 | Sechrist et al. .............. 55/348 |
| 7,048,782 B1 * | 5/2006 | Couch et al. ................ 95/269 |

FOREIGN PATENT DOCUMENTS

WO    WO 94/13388    6/1994

* cited by examiner

*Primary Examiner*—Robert A. Hopkins
(74) *Attorney, Agent, or Firm*—James C Paschall

(57) ABSTRACT

A third stage separator vessel includes a diffuser to promote uniform flow among an array of separation cyclones in the vessel. The vessel has an inlet to receive a gas stream containing solid particles, and the diffuser is mounted at the inlet so that at least some of the stream passes through the diffuser. In an embodiment, a gap between the diffuser and the inlet causes some of the gas stream to flow over an outer surface of the diffuser. The diffuser preferably includes a perforated plate mounted across a wide end of a frustoconical portion. The plate has a plurality of openings through which the flow passes. The openings in the plate have various sizes and positions to direct a greater amount of flow through radially outward portions of the plate than from a central portion of the plate.

20 Claims, 4 Drawing Sheets

DIFFUSER FOR SEPARATOR VESSEL

FIELD OF THE INVENTION

The present invention generally relates to a diffuser for a separator vessel that removes particles from a gas stream laden with solids and more particularly relates to a third stage separator (TSS) vessel for removing catalyst fines from exhaust gas of a fluid catalytic cracking (FCC) unit.

BACKGROUND OF THE INVENTION

FCC technology has long been a predominant means of producing gasoline. In an FCC process, gasoline is formed as the result of cracking heavier (i.e. higher molecular weight), less valuable hydrocarbon feed stocks such as gas oil. Although FCC is a large and complex process involving many factors, a general outline of the technology is presented here in the context of its relation to the present invention.

The FCC process generally includes a reactor that is closely coupled with a regenerator, followed by downstream hydrocarbon product separation. Hydrocarbon feed contacts catalyst in the reactor to crack the hydrocarbons down to smaller molecular weight products. During this process, the catalyst tends to accumulate coke thereon, which is burned off in the regenerator.

The heat of combustion in the regenerator typically produces a flue gas having an extremely high temperature. It is desirable to provide a power recovery device, such as an expander turbine, to recover energy from these high-temperature flue gases. It is known, for example, to provide a turbine that can be coupled to an air blower to produce combustion air for the regenerator or to a generator to produce electrical power.

The FCC process results in a continuous fluidization and circulation of large amounts of catalyst having an average particle diameter of about 50 to 100 microns, equivalent in size and appearance to very fine sand. For every ton of cracked product made, approximately 5 tons of catalyst are needed, hence the considerable circulation requirements. Coupled with this need for a large inventory and recycle of catalyst with small particle diameters is the ongoing challenge to prevent this catalyst from exiting the reactor or regenerator in effluent streams.

Catalyst particles are abrasive and thus are capable of damaging and eroding components located downstream of the reactor, such as a turbine. If exposed to catalyst particles, blades of the turbine would erode and result in loss of power recovery efficiency. Moreover, small catalyst fines do not erode expander turbine blades significantly but can accumulate on the blades and casing to cause rubbing. Environmental emission regulations also necessitate removal of catalyst fines from flue gas. Therefore, it is desirable to remove catalyst particles from the regenerator flue gas.

In order to remove solid catalyst particles, cyclone separators internal to both the reactor and regenerator have conventionally been implemented. Typically, the regenerator includes first and second (or primary and secondary) stage separators for the purpose of preventing catalyst contamination of the regenerator flue gas, which is essentially the resulting combustion product of catalyst coke in air. While normally sized catalyst particles are effectively removed in the internal regenerator cyclones, fines material (generally catalyst fragments smaller than about 50 microns resulting from attrition and erosion in the harsh, abrasive reactor/ regenerator environment) is substantially more difficult to separate. As a result, the FCC flue gas will usually contain a particulate concentration in the range of about two hundred to one thousand $mg/Nm^3$. This solids level can present difficulties related to the applicable legal emissions standards and are still high enough to risk damage to the power recovery expander turbine.

A further reduction in FCC flue gas fines loading is therefore often warranted, and may be obtained from a third stage separator (TSS). The term "third" in TSS typically presumes a first stage cyclone and a second stage cyclone are used for gas-solid separation upstream of the inlet to the TSS. These cyclones are typically located in the catalyst regeneration vessel. It is possible to provide more separator devices or fewer separator devices upstream of the TSS. Hence, as used herein, the term TSS does not require that exactly two separator devices are located upstream of the TSS vessel. The TSS induces centripetal acceleration to a particle-laden gas stream to force the higher-density solids to the outer edges of a spinning vortex. To be efficient, a cyclone separator for an FCC flue gas effluent will normally contain many (perhaps hundreds) of small individual cyclones installed within a single vessel. At least one tube sheet affixing the upper and/or lower ends of the cyclones acts to distribute contaminated gas to the cyclone inlets and also to divide the region within the vessel into sections for collecting the separated gas and solid phases.

Flow enters the TSS vessel from an inlet pipe located at a top of the vessel. The cyclones are mounted in an array across the width of the interior of the vessel, vertically below the inlet pipe. Generally, the gas flows downwardly into an interior of the vessel, which has a substantially greater diameter than the inlet pipe. If undiffused, gas flow from the inlet pipe travels downwardly toward the cyclones, the stream concentrating on some of the cyclones, while other cyclones not within the direct path of the stream are not used with optimal efficiency. In order to improve efficiency, it is desirable to disperse the gas flow from the inlet. In some TSS units, it has been known to provide a screen mounted to cover the inlet, and specifically, such screens have been provided in a cylindrical shape or a generally hemispherical shape having an array of openings through which the gas flows. Examples of conventional separator units are disclosed in U.S. Pat. No. 5,690,709; U.S. Pat. No. 6,673,133; and U.S. Pat. No. 6,797,026. Although such conventional screens have operated to partially diffuse the flow, a more effective diffuser is needed in the TSS.

SUMMARY OF THE INVENTION

A diffuser is provided for a TSS vessel designed to separate particulate solids from a contaminated gas stream entering the vessel through an inlet or inlet pipe. The diffuser improves flow distribution of the contaminated inlet stream from the inlet pipe among the plurality of separation cyclones mounted in the vessel a distance below the inlet. A process utilizing such a diffuser is also provided.

In an embodiment, the vessel includes a wall defining a generally cylindrical interior. The wall has a centrally positioned inlet pipe at a top of the vessel through which a stream of contaminated gas, laden with solids, enters the interior. The vessel further includes plurality of separation cyclones mounted in a fixed matter relative to the wall, the cyclones arranged in an array. The portion of the TSS vessel that houses the cyclones has a greater cross-sectional area than the inlet. A diffuser is mounted to the vessel wall within the interior so that at least a portion of the contaminated gas passes through the diffuser. The diffuser includes an annular body defining a passage having a narrow inlet end and a wider outlet end and a perforated plate mounted across the passage of the diffuser. The perforated plate has a plurality of openings. In an embodiment, at least a portion the body of the diffuser has a frustoconical shape and the perforated plate is mounted across an opening of the frustoconical portion.

In an embodiment, the vessel is a TSS, and the inlet is in communication with a catalyst regeneration vessel used in an FCC process. The solid particles in the contaminated inlet stream are a by-product of the FCC process. A related embodiment provides that the catalyst regeneration vessel includes at least one and preferably two cyclones in series in fluid communication with said contaminated gas inlet. It is also contemplated that a TSS vessel could be in downstream fluid communication with the product effluent of an FCC reactor vessel. The TSS vessel could also be located downstream of a reactor or regenerator vessel of other process units, such as an MTO unit.

In an embodiment, the openings in the perforated plate are configured to provide varying amounts of open area at multiple portions of the plate. For example, some of the openings in the perforated plate may have a greater area than others, and/or the openings may be provided with different spacing in some regions of the plate. In a specific example, openings in the perforated plate are configured to provide less open area per cross-sectional area in a central portion of the plate than at a radially outward portion. Preferably, the openings occupy about 35 to 55% of an area of the plate, and most preferably, the openings occupy about 45 to 50% of the plate area.

In an embodiment, the frustoconical section of the annular body tapers at an angle of about 20 to 23 degrees relative to vertical. Of course, in order to yield desired flow behavior, the degree of taper may vary depending on the dimensions of the vessel, the dimensions of the diffuser, the distance from the diffuser to the cyclones, the positions of the cyclones, the rate of inlet flow, or other factors.

In an embodiment, the diffuser is mounted in a manner such that it is spaced from the wall of the vessel so that a portion of the stream of contaminated gas from the inlet flows over an exterior surface of the diffuser.

In an embodiment, the diffuser further includes a cylindrical portion. The cylindrical portion defines an opening that faces the inlet, and the frustoconical portion extends downwardly and outwardly from the cylindrical portion in a tapered manner. The cylindrical portion is preferably positioned at least partially within the inlet and separated therefrom by an annular gap.

Accordingly, an object of the present invention is to provide a diffuser for a TSS vessel wherein the diffuser is configured to be mounted at an inlet to the TSS and is operable to promote proper flow distribution.

An advantage of the diffuser is that it disperses flow in a controlled fashion within the vessel interior, yielding a conical flow profile with improved uniformity.

Another advantage is improving operational efficiency of the vessel by optimizing the usage of the plurality of cyclones.

Additional features and advantages will be apparent from the following description, claims and figures.

DETAILED DESCRIPTION OF THE INVENTION

The present invention applies to the purification of a broad range of solid-contaminated gas streams, and especially those containing dust particles in the 1 to 20 μm range. A number of commercial gas purification operations meet this description, including the treatment of effluent streams of solid catalyst fluidized bed processes, coal fired heaters, and power plants. Several well-known refinery operations rely on fluidized bed technology, such as a preferred embodiment of the process for converting methanol to olefins (MTO), as described in U.S. Pat. No. 6,137,022, using a solid catalyst composition. Another area of particular interest lies in the purification of FCC effluent streams that contain entrained catalyst particles resulting from attrition, erosion, and/or abrasion under process conditions within the reactor. As mentioned, fluid catalytic cracking (FCC) is a well-known oil refinery operation relied upon in most cases for gasoline production. Process variables typically include a cracking reaction temperature of 400° to 600° C. and a catalyst regeneration temperature of 500° to 900° C. Both the cracking and regeneration occur at an absolute pressure below 5 atmospheres.

Figure 1:
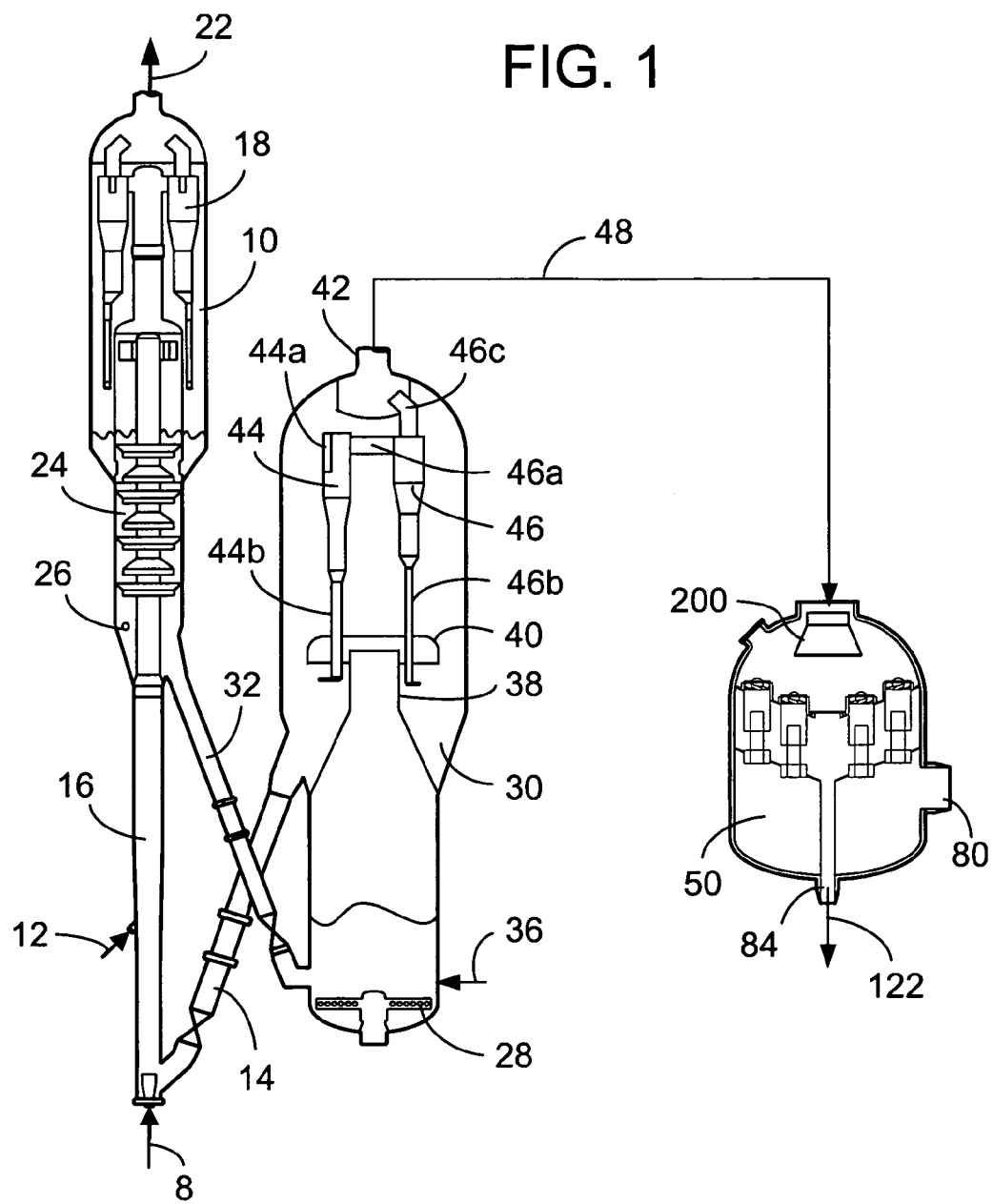
FIG. 1 is a schematic view of an FCC system having a TSS equipped with a diffuser constructed in accordance with features of the present invention.

FIG. 1 shows a typical FCC process unit, where a heavy hydrocarbon feed in a line 12 is contacted with a newly regenerated catalyst entering from a regenerated catalyst standpipe 14. This contacting may occur in a narrow reactor conduit 16, known as a reactor riser, extending upwardly to the bottom of a reactor vessel 10. The contacting of feed and catalyst is fluidized by gas from a fluidizing line 8. Heat from the catalyst vaporizes the oil, and the oil is thereafter cracked in the presence of the catalyst as both are transferred up the reactor conduit 16 into the reactor vessel 10 itself, operating at a pressure somewhat lower than that of the reactor conduit 16. The cracked light hydrocarbon products are thereafter separated from the catalyst using a first stage internal reactor cyclone 18 and an optional second stage internal reactor cyclone (not shown) and exit the reactor vessel 10 through a line 22 to subsequent fractionation operations. More cyclones or fewer cyclones may be used in the reactor vessel 10. It is contemplated that a TSS vessel may be used to remove catalyst fines from product gases in the line 22. At this point, some inevitable side reactions occurring in the reactor conduit 16 leave detrimental coke deposits on the catalyst that lower catalyst activity. The catalyst is therefore referred to as being spent (or at least partially spent) and undergoes regeneration for further use. Spent catalyst, after separation from the hydrocarbon product, falls into a stripping section 24 where steam is injected through a nozzle 26 to purge any residual hydrocarbon vapor. After the stripping operation, the spent catalyst is fed to a catalyst regeneration vessel 30 through a spent catalyst standpipe 32.

FIG. 1 illustrates the regeneration vessel 30 known as a combustor. Those skilled in the art will recognize that various types of regeneration vessels may be suitable and that the invention is not limited to the exemplary regeneration vessel 30 illustrated. In the catalyst regeneration vessel 30, a stream of air is introduced through an air distributor 28 to contact the spent catalyst, burn coke deposited thereon, and provide regenerated catalyst. The catalyst regeneration process adds a substantial amount of heat to the catalyst, providing energy to offset the endothermic cracking reactions occurring in the reactor conduit 16. Some fresh catalyst is added in a line 36 to the base of the catalyst regeneration vessel 30 to replenish catalyst exiting the reactor vessel 10 as fines material or entrained particles. Catalyst and air flow upward together along a combustor riser 38 located within the catalyst regeneration vessel 30 and, after regeneration (i.e. coke burn), are initially separated by discharge through a disengager 40, also within the catalyst regeneration vessel 30.

Finer separation of the regenerated catalyst and flue gas exiting the disengager 40 is achieved using, for example, a first stage separator cyclone 44 and a second stage separator cyclone 46 within the catalyst regeneration vessel 30 as illustrated in FIG. 1. It is possible that more separator cyclones or fewer separator cyclones can be used in the regeneration vessel 30. Flue gas enters the first stage separator cyclone 44 through an inlet 44a. Catalyst separated from flue gas dispenses through a dipleg 44b while flue gas relatively lighter in catalyst travels through a conduit 46a into the second stage separator cyclone 46. Additional catalyst separated from the flue gas in the second stage separator cyclone 46 is dispensed into the catalyst regeneration vessel 30 through a dipleg 46b while flue gas relatively even lighter in solids exits the second stage separator cyclone 46 through an outlet tube 46c.

Still referring to FIG. 1, regenerated catalyst is recycled back to the reactor vessel 10 through the regenerated catalyst standpipe 14. As a result of the coke burning, the flue gas vapors exiting at the top of the catalyst regeneration vessel 30 in a nozzle 42 contain CO, $CO_2$ and $H_2O$, along with smaller amounts of other species. While the first stage separator cyclone 44 and the second stage separator cyclone 46 can remove the most of the regenerated catalyst from the flue gas in the nozzle 42, fine catalyst particles, resulting mostly from attrition, invariably contaminate this effluent stream. The fines-contaminated flue gas therefore typically contains about two hundred to one thousand $mg/Nm^3$ of particulates, most of which are less than fifty microns in diameter. In view of this contamination level, and considering both environmental regulations as well as the option to recover power from the flue gas, the incentive to further purify the relatively contaminated flue gas using a TSS vessel is significant. A conduit 48 delivers the contaminated flue gas to a TSS vessel 50 containing a diffuser 200. The TSS vessel 50 separates solids which exit in a solids line 122 through a solids outlet 84 from gases which exit in a clean gas line 90 through a clean gas outlet 80.

Figure 2:
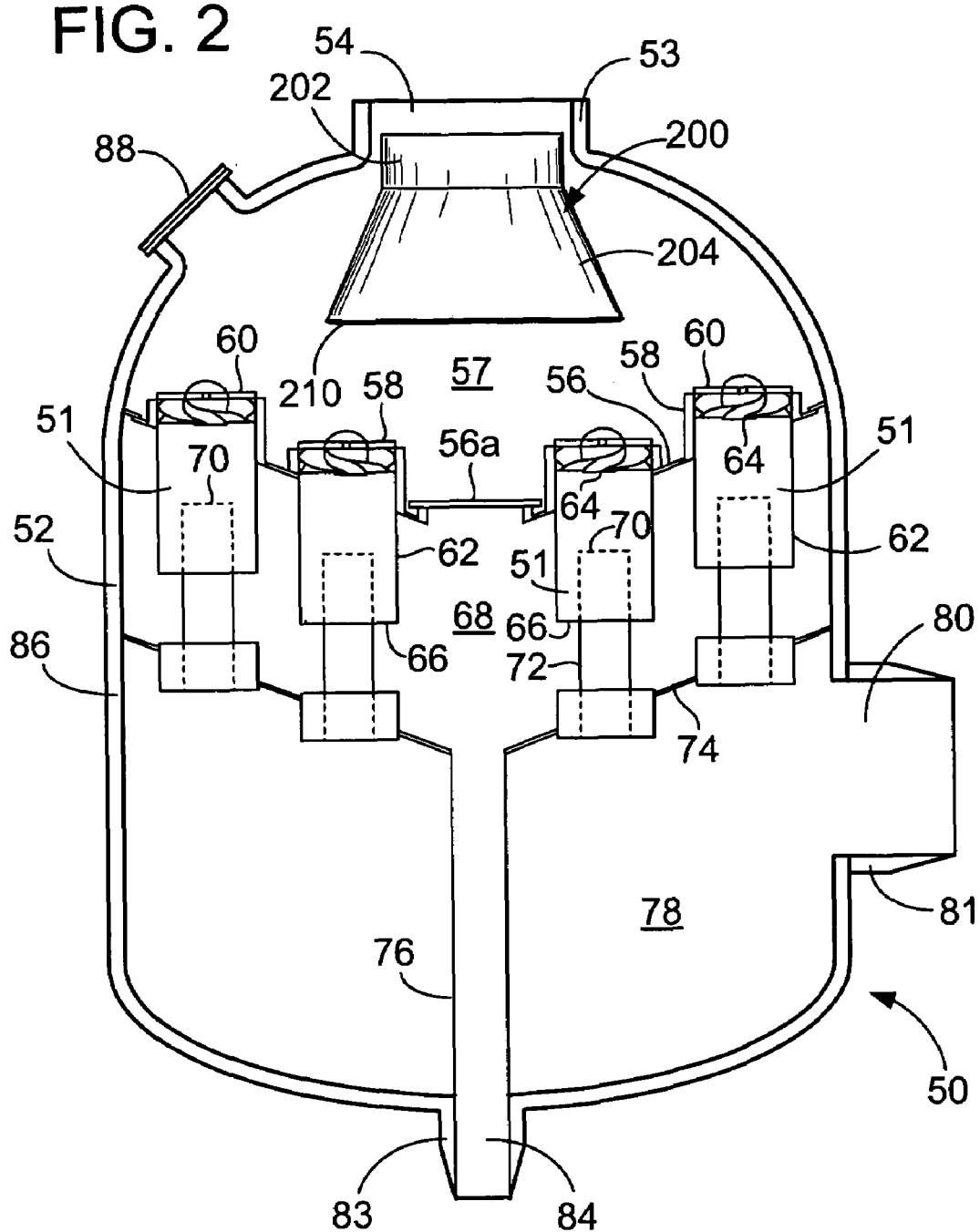
FIG. 2 is a schematic view of the TSS vessel of FIG. 1, including the diffuser.

Now turning to FIG. 2, the TSS vessel 50 is illustrated in greater detail. The TSS vessel 50 includes a plurality of individual cyclones 51. Although only four cyclones 51 are visible in FIG. 2, those of ordinary skill in the art will recognize that the invention herein can be used with a diffuser having any number of cyclones. For example, contemplated embodiments are expected to include at least ten and as many as about two hundred cyclones 51 in variously sized units.

The TSS vessel 50 includes an exterior wall 86 that includes a generally vertical wall 86a, a bottom portion 86b, and a top portion 86c, defining an enclosed interior. An inlet 54 is formed by an inlet pipe 53 that extends centrally from the top portion 86c. A stream of fines-contaminated gas such as in the conduit 48 from the catalyst regeneration vessel 30 (FIG. 1) enters the top of the TSS vessel 50 at the centrally positioned contaminated gas inlet 54. An interior surface of the wall 86 may be lined with a refractory material 52 to reduce erosion of the metal surfaces by the entrained catalyst particles.

Vertically below the inlet 54, at an intermediate position within the interior of the vessel 50, the vessel includes an upper tube sheet 56 that retains top ends 58 of the respective cyclones 51. In an embodiment, the upper tube sheet 56 extends the entire cross-section of the TSS vessel 50 in a manner that separates the interior to define an upper inlet chamber 57 so as to limit communication from the inlet chamber 57 and to the remainder of the TSS vessel 50 except through the cyclones 51. In particular, each of the cyclones 51 has a cyclone inlet 60 that is open to the inlet chamber 57. The tube sheet 56 may include a cover 56a for an optional manway in order to provide access through the upper tube sheet 56.

The contaminated gas enters the respective cyclone inlets 60 and encounters one or more swirl vanes 64 proximate the inlets 60 to induce centripetal acceleration of the particle-contaminated gas. The swirl vanes 64 are structures within a cylindrical cyclone body 62 that have the characteristic of restricting the passageway through which incoming gas can flow, thereby accelerating the flowing gas stream. The swirl vanes 64 also change the direction of the contaminated gas stream to provide a helical or spiral formation of gas flow through the length of the cylindrical cyclone body 62. This spinning motion imparted to the gas sends the higher-density solid phase toward the wall of the cylindrical cyclone body 62. The cyclones 51, in an embodiment, include a closed bottom end 66 of the cylindrical cyclone body 62.

In order to physically extract the solid particles from the primary gas flow, in an embodiment, the cylindrical cyclone body 62 has slots configured to permit the passage of the solid particles that have been forced outwardly toward the cylindrical cyclone body 62 by the centripetal force of the cyclone 51. The removed particles fall into a solids chamber 68 between the upper tube sheet 56 and a lower tube sheet 74. The upper tube sheet 56 and the lower tube sheet 74 limit communication between the solids chamber 68 and the rest of the TSS vessel 50. As illustrated in FIG. 2, the lower tube sheet 74 is preferably shaped as a funnel or inverted cone to guide the solids into a solids outlet tube 76 through which the solids and a minor amount of underflow gas exit the solids chamber 68. In an embodiment, the solids outlet tube 76 extends from the TSS vessel 50 through the outlet 84 defined by a nozzle 83.

The solids removed by the TSS vessel 50 which exit through the solids outlet 84 can be optionally taken by the line 122 to a fourth stage separator (not shown) to further remove underflow gas from catalyst and collect the catalyst in a recovered catalyst hopper and/or the underflow gas may be delivered to other types of additional processing.

Clean gas, from which the solids have been removed, flows vertically downward through the cylindrical cyclone body 62, passes through an inlet 70 of a cyclone gas outlet tube 72. The clean gas is then discharged via the cyclone gas outlet tube 72 below the lower tube sheet 74 into a clean gas chamber 78. The lower tube sheet 74 defines an upper boundary to the clean gas chamber 78 and prevents communication between the clean gas chamber 78 and the solids chamber 68. The clean gas stream, representing the bulk of the flue gas fed to the TSS vessel 50, then exits through the clean gas outlet 80 of the TSS vessel 50. The clean gas outlet 80 communicates only with the clean gas chamber 78. In an embodiment, the clean gas outlet 80 is positioned below the lower tube sheet 74. Clean gas outlet nozzles 81 may extend from the vertical wall 86a of the TSS vessel 50. The clean gas outlet nozzle 81 may also extend from other walls of the TSS vessel 50. For example, the clean gas outlet may extend from the bottom portion 86b of the TSS vessel 50 and perhaps be concentric with but isolated from the solids outlet 84.

Manways 88 to the TSS vessel 50 are covered during operation and allow access during maintenance and construction. A trash screen or grating (not shown) may be installed in the clean gas outlet 80 to block passage of spalling refractory.

With reference to FIGS. 1 and 2, the clean gas exiting the clean gas outlet 80 travels downstream in the line 90 which may lead to a downstream device. For example, the line 90 may be directed to a power recovery unit (not shown) such as an expander turbine.

In accordance with an aspect of the invention, in order to improve the flow delivery to the cyclones, the TSS vessel includes a diffuser mounted to the vessel wall near the inlet to diffuse the inlet stream in a manner that promotes uniformity of flow among the plurality of cyclones. In particular, the diffuser includes an outwardly flaring annular body that defines a passage with a narrow inlet end with a smaller cross-sectional area than a wider outlet end with a larger cross-sectional area than the inlet end. The diffuser is preferably mounted so that the diffuser is spaced from the inlet by a gap so that a portion of the inlet stream passes through the diffuser and a portion of the inlet stream flows around an exterior surface of the diffuser. Additionally, the diffuser may include a perforated plate having a plurality of flow openings adapted to provide a desired dispersion effect.

Figure 3:
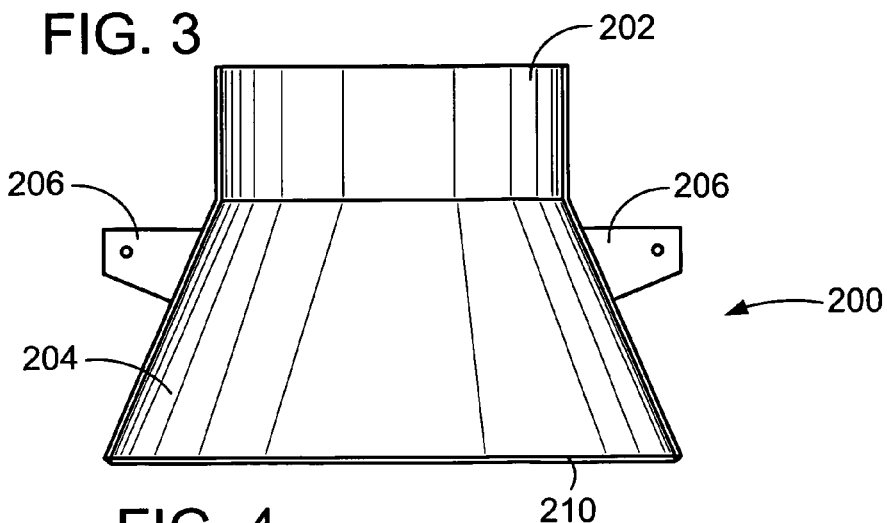
FIG. 3 is a side elevation of the diffuser of FIGS. 1 and 2.
Figure 4:
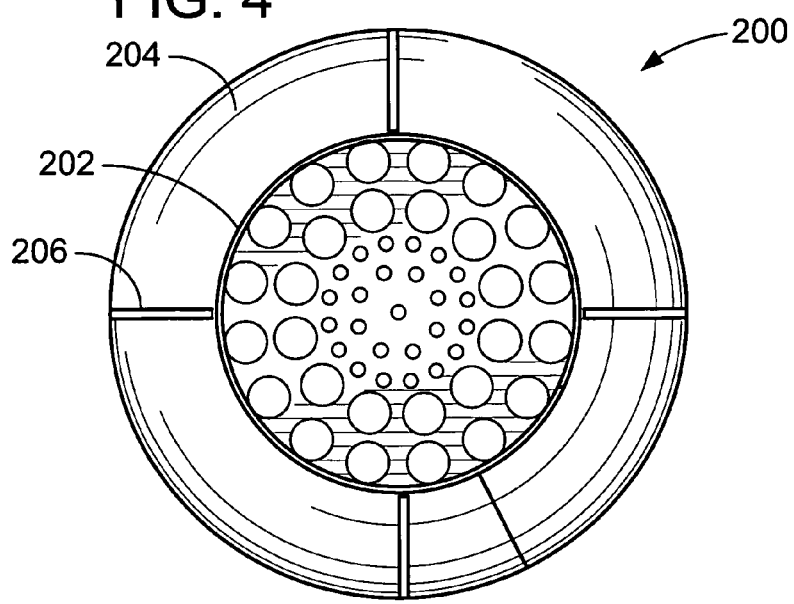
FIG. 4 is a plan view of the diffuser of FIG. 3.
Figure 5:
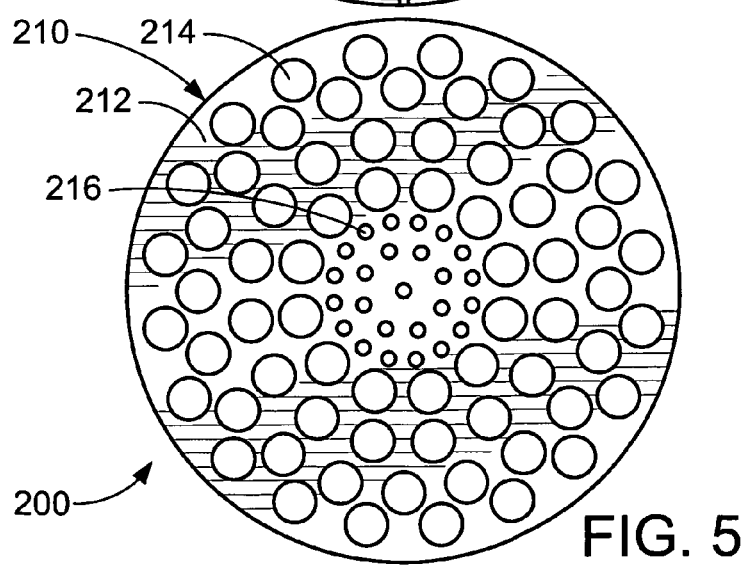
FIG. 5 is a base view of the diffuser of FIG. 4, showing the perforated plate.

For example, referring to FIG. 2, the diffuser 200 is illustrated mounted within the inlet chamber 57 of the TSS vessel 50. The diffuser 200 is also illustrated in FIGS. 3-5. The diffuser 200 has an annular body that generally includes an inverted cone or frustoconical portion 204, and in an embodiment, the diffuser includes a cylindrical portion 202 that extends upwardly from a narrow inlet end of the frustoconical portion 204. The annular cylindrical portion 202 and the frustoconical portion 204 define a diffuser passage. In an embodiment, the frustoconical portion may have a serrated lower edge (not shown) to further distribute the inlet stream in the outer annular area. Additionally, as illustrated in FIGS. 4 and 5, the diffuser 200 includes a perforated plate 210 which has a plurality of openings 214, 216. The plate 210 is preferably mounted to the frustoconical portion 204 to extend across the diffuser passage, and the plate 210 is preferably mounted at a wide end of the frustoconical portion 204 where the flow exits the diffuser 200. For mounting, the diffuser 200 includes a plurality of brackets 206 that project outwardly, as shown in FIGS. 3 and 4. The diffuser 200 is mounted to the wall 86 generally at the inlet 54 so that at least some of the inlet stream flows through the passage in the diffuser 200. It will be understood that the brackets 206 can be secured to like bracket structures projecting from the wall 86 of the TSS vessel 50.

Referring to FIG. 2, the diffuser 200 may be mounted to the top portion 86c of the wall 86 so that the cylindrical portion 202 extends partially upward into the inlet 54. In order to direct some of the conduit 48 around an exterior surface of the diffuser 200, in an embodiment, the diffuser 200 is mounted in a manner so that it is spaced from the inlet 54 and from the wall 86. For example, referring to FIG. 2, the cylindrical portion 202 of the diffuser 200 is spaced from the inlet pipe 53 by a generally annular gap. The cylindrical portion 202 has an outer diameter sized relative to the inner diameter of the inlet pipe 53 to provide a desired flow area to result in a desired diffusion behavior. For example, in a TSS wherein the inlet pipe 53 has an inner diameter of about 74 cm (29 inches), suitable performance has resulted wherein the cylindrical portion 202 has a diameter of about 61 cm (24 inches) and wherein the cylindrical portion 202 extends about 7.6 cm (3 inches) upwardly into the inlet 54. The brackets 206 may be planar and aligned with the direction of flow to reduce resistance of flow through the gap.

In order to expand the inlet stream flowing through the diffuser, thereby reducing flow velocity and to also provide a desired amount of exterior flow deflection, the frustoconical portion 204 of the annular body is tapered in shape, flaring outwardly at its lower end. The frustoconical portion 204 can be designed to have any degree of taper that yields desired results. It has been found that a taper of about 20 to 23 degrees from vertical is suitable. Such a frustoconical portion 204 may have a lower diameter of about 97 cm (38 inches), an upper diameter of about 61 cm (24 inches), and a vertical height of about 44 cm (17⅜ inches).

Figure 6:
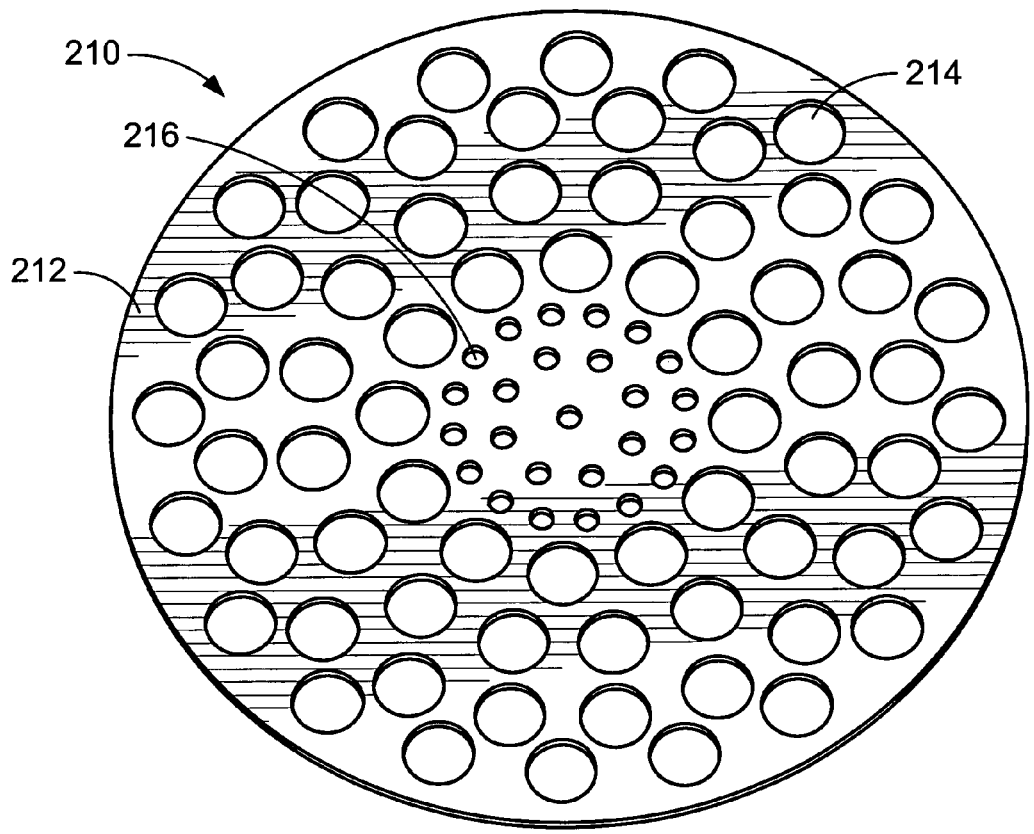
FIG. 6 is a perspective view of the perforated plate.
Figure 7:
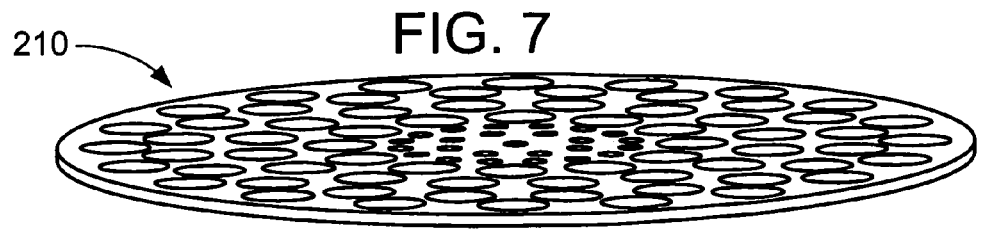
FIG. 7 is a view of the perforated plate of FIG. 6, further rotated.

For directing flow exiting the diffuser in a controlled manner, the openings 214, 216 of the perforated plate 210 may be configured to provide varying amounts of open area per cross-sectional area at different portions of the plate 210. In particular, the amount of open area per cross-sectional area can be designed by providing the openings in different sizes and at different concentrations or spacing from each other. Referring to the exemplary plate 210 illustrated in FIGS. 5-7, the openings 214 and 216 are provided in respectively different sizes. The openings 216 are relatively smaller and located in a central portion of the plate, and the openings 214 are relatively larger, and are located at the region radially outward from the openings 214. The central region having the small openings 214 has less open area than the radially outward region having the larger openings 216, and as a result, the plate 210 guides a greater amount of flow through the radially outward region, helping to shape a desired flow profile of fluid exiting the diffuser 200. The same result may be obtained by varying the pitch of openings occupying the same cross-sectional area. Other variations are also contemplated. It has been found that suitable results may be achieved with a plate wherein the openings occupy about 35 to 55% of an area of the plate, and in a preferred plate the openings occupy about 45 to 50% of the area of the plate.

The diffuser 200 operates to diffuse flow from the inlet in a manner that helps to promote a proper distribution of the contaminated gas stream among the cyclones. Various design features (e.g., dimensions, taper angle, proportion of flow around the exterior of the diffuser, size and placement of holes in the perforated late, etc.) may be adapted for desired results. Efficiency of the TSS vessel 50 is improved as a result.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A vessel for separating particulate solids from a contaminated gas stream, the vessel comprising:
a wall defining a generally cylindrical interior, the wall including an inlet at a top of the vessel through which a stream of contaminated gas enters the interior;
a plurality of separation cyclones mounted in a fixed manner relative to the wall within the interior, the cyclones arranged in an array vertically below the inlet;
a diffuser mounted to the vessel wall within the interior so that at least a portion of the contaminated gas passes through the diffuser, the diffuser including:
an annular body defining a passage having a narrow inlet end and a wider outlet end; and
a perforated plate mounted across the passage of the diffuser, the perforated plate having a plurality of openings.

2. The vessel of claim 1, wherein the inlet is in communication with a catalyst regeneration vessel.

3. The vessel of claim 2, wherein at least a portion of the body of the diffuser has a frustoconical shape and the perforated plate is mounted across an opening of the frustoconical portion.

4. The vessel of claim 1, wherein the openings in the perforated plate are configured to provide varying amounts of open area per cross-sectional area at multiple portions of the plate.

5. The vessel of claim 4, wherein some of the openings in the perforated plate have a greater area than in others.

6. The vessel of claim 4, wherein more openings are provided in some portions of the plate than others.

7. The vessel of claim 4, wherein the openings in the perforated plate provide less open area in a central portion of the plate than at a radially outward portion.

8. The vessel of claim 1, wherein the openings occupy about 35 to 55% of an area of the plate.

9. The vessel of claim 1, wherein the openings occupy about 45 to 50% of an area of the plate.

10. The vessel of claim 3, wherein the frustoconical section tapers at an angle of about 20 degrees relative to vertical.

11. The vessel of claim 1, wherein the diffuser is mounted in a manner such that it is spaced from the wall of the vessel so that a portion of the stream of contaminated gas from the inlet flows over an exterior surface of the diffuser.

12. The vessel of claim 11, wherein the diffuser further includes a cylindrical portion that is open toward the inlet, a frustoconical portion extending downwardly outwardly from the cylindrical portion in a tapered manner, the cylindrical portion being positioned at least partially within the inlet and separated therefrom by an annular gap.

13. A system comprising:
a catalyst regeneration vessel including at least one cyclone to remove at least some solid particles from a contaminated gas stream;
a third stage separator vessel for further removing particulate solids from the contaminated gas stream, the vessel comprising:
a wall defining an interior, the wall including an inlet receiving the contaminated gas from the catalyst regeneration vessel;
a plurality of separation cyclones mounted within the interior in an array a distance from the inlet; and
a diffuser including an annular body, defining a passage, the diffuser mounted to the vessel wall within the interior so that a portion of the contaminated gas passes through the passage and a portion of the contaminated gas passes over an exterior surface of the annular body, the annular body tapering outwardly as it extends away from the inlet.

14. The system of claim 13, wherein the diffuser further includes a perforated plate mounted across the passage through the annular body that defines a frustoconical portion, the perforated plate having a plurality of openings.

15. The system of claim 13, wherein the openings in the perforated plate are configured to provide varying amounts of open area per cross-sectional area at different portions of the plate.

16. The system of claim 13, wherein the diffuser further-includes a cylindrical portion that extends upwardly from a narrow inlet end of a frustoconical portion, the cylindrical portion being positioned at least partially within the inlet and separated therefrom by an annular gap through which a portion of the contaminated gas is directed over an exterior of the diffuser.

17. A process for separating particulate solids from a contaminated gas stream, the process comprising the steps of:
delivering said contaminated gas stream through an inlet pipe to a separator vessel having a wall that defines an interior;
providing a diffuser mounted to the wall near the inlet, the diffuser defining a passage increasing in cross-sectional area as it extends away from the inlet, and a perforated plate mounted to extend across a wide end of the passage, the perforated plate having a plurality of openings;
passing at least some of the contaminated gas stream through the diffuser to exit the diffuser through the openings in the perforated plate;
diffusing the flow from the diffuser among a plurality of separation cyclones mounted in an array within the interior a distance below the diffuser; and
separating particulate solids from said contaminated gas stream in said cyclones.

18. The process of claim 17, further comprising passing some of the contaminated gas around an exterior of the diffuser.

19. The process of claim 18, wherein the diffuser further includes a cylindrical portion that extends vertically upward from a narrow inlet end of a frustoconical portion, an exterior diameter of the cylindrical portion being smaller than an inner diameter of the inlet to define an annular gap.

20. The process of claim 17, further comprising, before said delivering step, withdrawing said contaminated gas from a catalyst regeneration vessel.

* * * * *